June 5, 1923.　　　　　　　　　　　　　　　　　　　1,457,883
F. TWYMAN
ANNEALING AND APPARATUS USED THEREIN
Filed Sept. 7, 1921
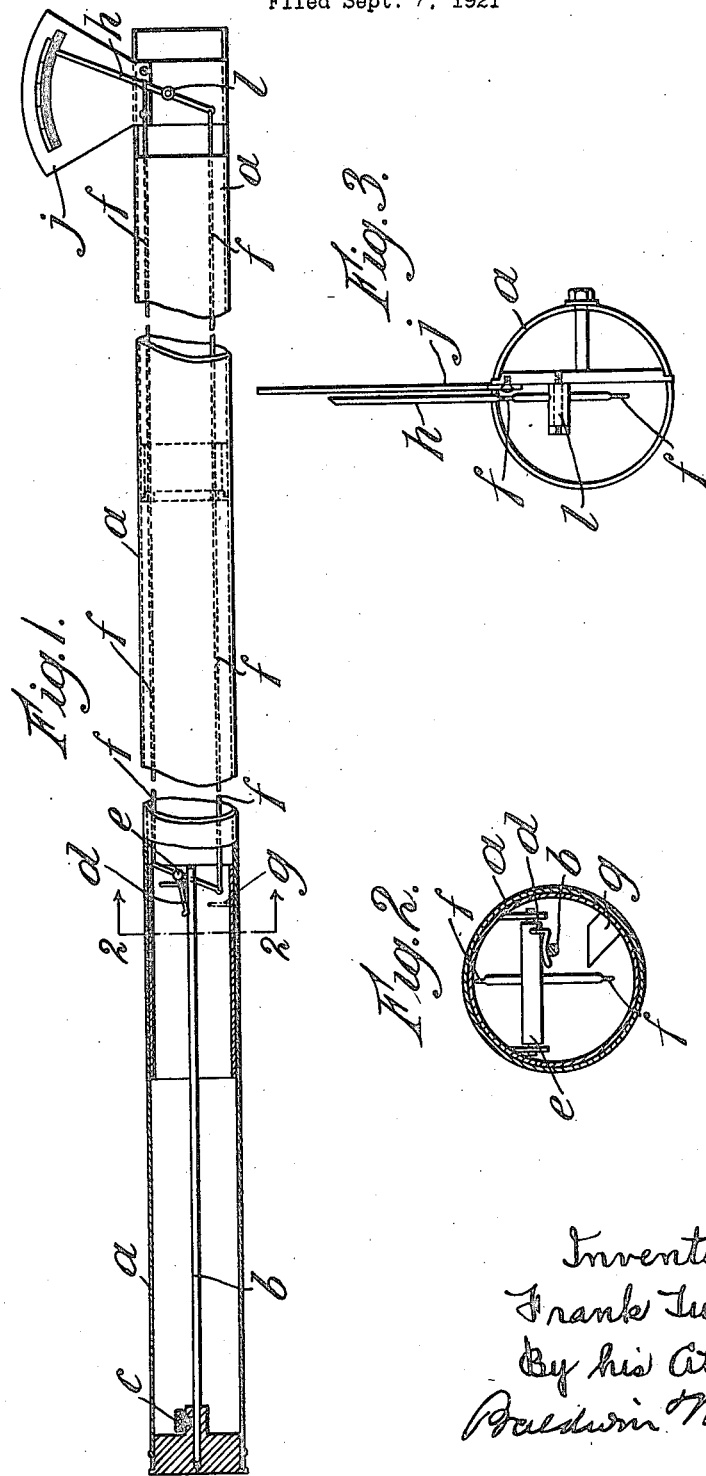
Inventor:
Frank Twyman
By his Attorneys,
Baldwin Wight Patented June 5, 1923.

1,457,883

UNITED STATES PATENT OFFICE.

FRANK TWYMAN, OF LONDON, ENGLAND, ASSIGNOR TO ADAM HILGER, LIMITED, OF LONDON, ENGLAND.

ANNEALING AND APPARATUS USED THEREIN.

Application filed September 7, 1921. Serial No. 499,117.

*To all whom it may concern:*

Be it known that I, FRANK TWYMAN, a subject of the King of Great Britain, residing at 75ª Camden Road, London, England, have invented new and useful Improvements in Annealing and Apparatus Used Therein, of which the following is a specification.

This invention relates to the annealing of certain substances which at high temperatures may be regarded as acting as viscous liquids, for instance, glass, porcelain and some metals. The invention also relates to apparatus suitable for use in the annealing process.

In the specification of my former United States Patent No. 1,324,418, I have described the process of annealing dependent on the deformation of a rod of the substance to be annealed which rod is maintained under stress. In the above specification I gave a formula by means of which the dimensions of the rod could be found. This formula was dependent upon the knowledge of the moduli of elasticity or rigidity of the substances as the temperature was raised, and it has been objected that no data are available giving the moduli of elasticity or rigidity of glass at temperatures within the annealing range. This objection however is not practically serious as the moduli of glasses do not greatly vary as the temperature is raised and also because a very large change of the moduli is necessary before large differences of annealing temperature arise.

The process described in my former specification can be worked without a kowledge of the annealing temperature. It may however in practice be found desirable that such temperatures should be known and the difficulty of determining the annealing temperature of glass from its viscosity is fundamental, for if E is the modulus of elasticity and T the time of relaxation, then the viscosity is E × T and as stated above the values of E are not available.

Moreover, according to the present practice annealing temperatures which are arrived at by means of measurements of viscosity are found by ascertaining the temperature at which the viscosity has an observed value. Such practice requires the observation of a thermometer, and the observation of another thermometer is required in reproducing the temperature.

The present invention is based, as is the former one, on Clerk Maxwell's expression for the removal of stress in viscous solids:—

"A distortion or strain of some kind, which we may call S, is produced in the body by displacement. A state of stress or elastic force, which we may call F, is thus excited. The relation between the stress and the strain may be written F=ES, where E is the coefficient of elasticity for that particular kind of strain.

"In a solid body free from viscosity F will remain=ES, and $$\frac{dF}{dt} = E\frac{dS}{dt}$$

"If however the body is viscous, F will not remain constant, but will tend to disappear at a rate depending on the value of F, and on the nature of the body. If we suppose this rate proportional to F, the equation may be written:—

$$\frac{dF}{dt} = E\frac{dS}{dt} - \frac{F}{T},$$

which will indicate the actual phenomena in an empirical manner. For if S be constant, $$F = ESe^{-\frac{t}{T}}$$

showing that F gradually disappears, so that if the body is left to itself it gradually loses any internal stress, and the pressures are finally distributed as in a fluid at rest."

If I now define the desired state of annealing by saying that I require the stresses originally present to be reduced in a particular proportion in which $F_0$ is the original stress, it will be seen that if, as is the case, my problem demands that I should assure myself that $$\frac{F}{F_0} = \frac{ESe^{-\frac{t}{T}}}{ES} = e^{-\frac{t}{T}}$$

arrives at a particular value in the articles being annealed, a knowledge of the values of E and S are not needed but only of the value of T, namely the time of relaxation.

According to this invention the time of relaxation is found by introducing a piece of the substance of which the articles to be annealed are made into the furnace containing the articles to be annealed. The piece of substance is strained a definite amount, sufficient stress being brought to bear to deform it, and periodically the stress is removed. At first the substance will spring back to its former shape but as the temperature is raised the substance will not spring back entirely when released, and from a record of the time during which the piece has been kept strained and the extent to which it recovers its original position, it is possible to calculate the time of relaxation at that temperature or if a degree of annealing $\frac{F}{F_o}$ is required to be attained I shall know that such a degree of annealing has been achieved when the proportion of the "spring back" of the piece of substance is $\frac{F}{F_o}$.

The apparatus for use in the process is shown in the annexed drawing. Figure 1 is a longitudinal section, Figure 2 is a section on the line 2—2, Figure 1, and Figure 3 is an elevation of the right hand end of the apparatus.

$a$ is a tube in which is a piece $b$ of the substance to be annealed held at one end by a screw $c$, whilst one member of a bell crank lever $d$ engages with the free end of the piece of substance. When the bell crank $d$ is turned upon its pivot $e$ by the wires $f$ connected to pointer $h$ the piece is bent and the amount of bending is limited by engagement with a stop $g$. This result is effected by manual operation of the pointer $h$. On the bell crank lever $d$ being released, the piece springs back and the amount of bending and of "spring back" is marked by a pointer $h$ moving over graduations on a plate $j$, the pointer $h$ being pivoted at $l$ and the wires $f$ attached to it.

What I claim is:—

1. The method hereinbefore described of ascertaining the time of relaxation of a substance, which consists in subjecting to the annealing heat a piece of the same substance as that to be annealed, placing said piece under sufficient stress to deform it a definite amount, periodically removing the stress and measuring the spring back of the piece.

2. The method hereinbefore described of ascertaining the time of relaxation of a substance, which consists in subjecting a piece of the substance to be annealed to heat, placing the piece under sufficient stress to deform it a definite amount while being heated and periodically removing the stress and measuring the spring back to indicate the progress of the relaxation.

3. Apparatus for ascertaining the time of relaxation of a substance, comprising a piece of the substance to be annealed, means whereby stress may be temporarily applied to the piece and whereby the spring back of the piece may be measured.

4. Apparatus for ascertaining the time of relaxation of a substance comprising a piece of the substance to be annealed, means for holding one end of the piece and means whereby stress may be applied to the piece and whereby the spring back when the stress is released may be measured.

5. Apparatus for ascertaining the time of relaxation of a substance comprising a piece of the substance to be annealed, means for holding one end of the piece, means for stressing the piece, a stop for limiting the amount of stressing and means for measuring the movement of the piece when the stress is removed.

6. Apparatus for ascertaining the time of relaxation of a substance comprising a piece of the substance to be annealed, means for holding one end of the piece, a bell crank lever one of whose members is adapted to engage the piece to place it under stress and manual means for actuating the bell crank lever.

7. Apparatus for ascertaining the time of relaxation of a substance comprising a piece of the substance to be annealed, means for holding one end of the piece, a bell crank lever one of whose members is adapted to engage the piece to place it under stress, means for actuating the bell crank lever, and means for measuring the movement of the piece when said actuating means is released.

In testimony that I claim the foregoing as my invention I have signed my name this twenty fourth day of August, 1921.

FRANK TWYMAN.